United States Patent [19]

Adams

[11] 4,126,555
[45] Nov. 21, 1978

[54] TEA STRAINER WITH HINGED HANDLE

[76] Inventor: Richard M. Adams, 31 McAllister Ave., Kentfield, Calif. 94904

[21] Appl. No.: 846,805

[22] Filed: Oct. 31, 1977

[51] Int. Cl.² .............................................. B01D 35/00
[52] U.S. Cl. ..................................... 210/238; 99/323; 210/470; 210/474
[58] Field of Search .................. 99/306, 323; 210/237, 210/238, 241, 470, 474

[56] References Cited

U.S. PATENT DOCUMENTS

| 1,067,290 | 7/1913 | Washburn et al. | 99/323 |
| 1,392,383 | 10/1921 | Wills | 210/470 |

FOREIGN PATENT DOCUMENTS

| 130,839 | 1/1949 | Australia | 99/323 |
| 1,041,910 | 10/1953 | France | 99/323 |
| 1,057,633 | 3/1954 | France | 99/323 |
| 306,957 | 7/1955 | Switzerland | 99/306 |

Primary Examiner—Frank A. Spear, Jr.
Assistant Examiner—Richard W. Burks
Attorney, Agent, or Firm—Owen, Wickersham & Erickson

[57] ABSTRACT

A tea strainer for use in straining tea while it is poured into a teacup, which may be sitting in a saucer. A bowl-like sieve member, provided with projections for engaging the lip of the cup, also has a handle which is made in two parts connected together by a hinge. The hinge is so located that the outer portion of the handle can swing downwardly into contact with the table on which the cup rests. The inner handle portion is sufficiently long so that it lies normally beyond the diameter of the saucer when the cup is sitting in the saucer. The hinge is stiff enough so that it ordinarily must be manually and purposely moved from one position to another. When held in the hand, the tea strainer functions as a normal tea strainer with a stiff handle, but when placed in the cup and the handle moved about the hinge and put in contact with the table, it becomes self-supporting.

2 Claims, 3 Drawing Figures

TEA STRAINER WITH HINGED HANDLE

BACKGROUND OF THE INVENTION

This invention relates to an improved tea strainer which can be made to be self-supporting in use.

Typical tea strainers, although they may be able to be rested on the cup, do not have the ability to support themselves in the cup without the user holding it by the handle. Typically, the handle weighs so much more than the strainer portion that it overbalances that portion, and the strainer swings itself out of the cup. This can be very inconvenient while pouring tea and on some occasions makes it very difficult for the person pouring.

The principal object of the present invention is to provide a tea strainer that can be operated so that it will be supported by the cup and by the table on which the cup rests, whether the cup is in a saucer or not, and which, therefore, leaves free the hand that would otherwise have to support it.

For example, if the person pouring is also passing out other cups or refreshments, the present tea strainer will make that quite feasible, whereas a typical contemporary tea strainer makes that operation difficult, if not impossible.

Moreover, if one wishes to make a single cup of tea by pouring hot water over tea leaves in a strainer resting in a teacup, the present invenion makes it possible to steep the tea without having to hold the handle and without being concerned that the strainer will not seat completely in the water.

SUMMARY OF THE INVENTION

The improved tea strainer of this invention has a bowl-like sieve member with a rim from which projects cup-lip engaging means. Opposite the cup-lip engaging means, or at least on the opposite side of the rim from it, a handle projects out. The handle is made of two parts connected together by a stiff hinge. The stiff hinge is located on the bottom of the handle so that the outer portion of the handle can be swung down into engagement with the table, while the inner portion remains projecting rigidly from the rim. By making the hinge stiff, the handle will not simply collapse but will stay into such position as it is moved, whether used straight on when held with the hand or whether self-supporting at such times as desired. It can also remain in position while the tea is steeping, so that the user does not need to hold the strainer after the tea has been poured.

Other objects and advantages of the invention will appear from the following detailed description.

DETAILED DESCRIPTION OF A PREFERRED FORM OF THE INVENTION

Figure 1:
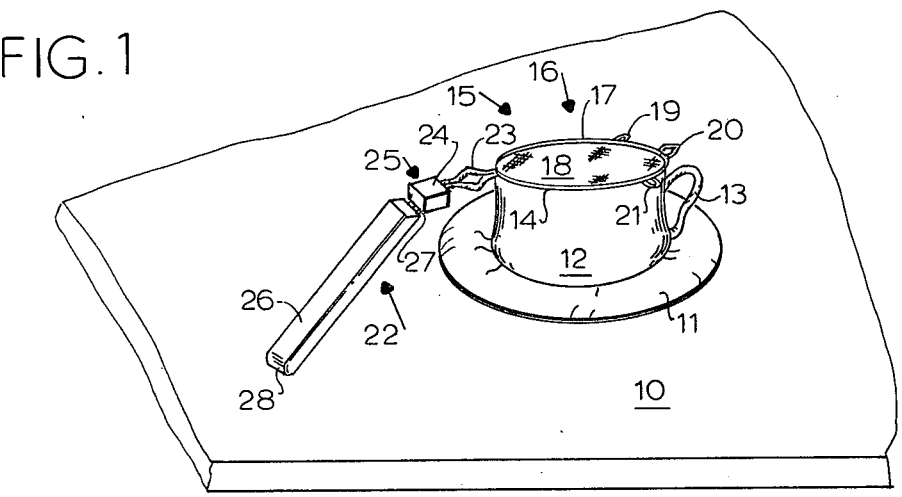
FIG. 1 is a view in perspective of a teacup and saucer on a table, part of which has been broken away, and a tea strainer embodying the principles of the invention and shown in a self-supporting position.

FIG. 1 shows a table 10 on which rests a saucer 11 the supports a teacup 12 having a handle 13 and a lip 14.

Figure 2:
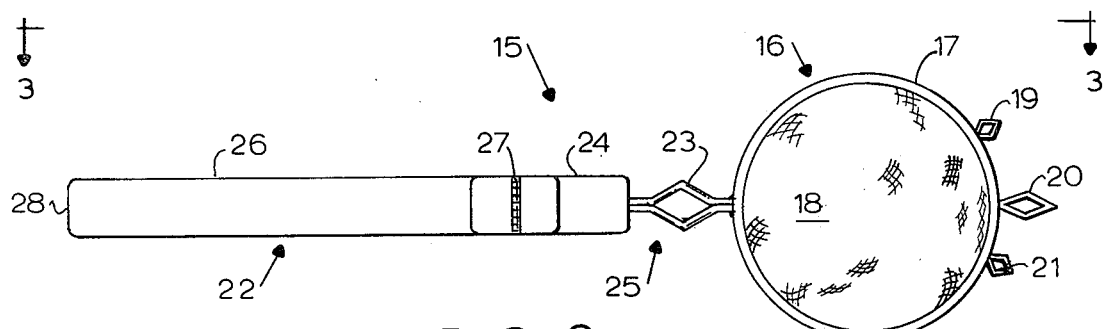
FIG. 2 is a top plan view of the tea strainer with the hinge in its closed position.
Figure 3:
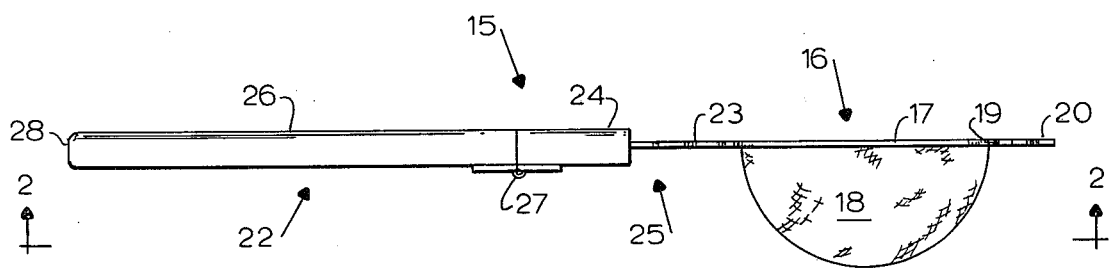
FIG. 3 is a view in side elevation of the same with the hinge in its closed position.

A tea strainer 15 is shown in the cup FIG. 1 and is shown in FIGS. 2 and 3 on an enlarged scale outside the cup 12. The tea strainer 15 comprises a bowl-shaped sieve 16 having a rim 17 supporting an hemispherical wire screen 18. Projections 19, 20, and 21 serve to rest on the cup lip 14. Opposite the projection 19 is handle 22 extending out from the rim and rigidly secured to it. The handle 22 may include an initial wire portion 23 and, rigidly secured to that, a portion 24, which may be plastic, wood, or other such material, the portions 23 and 24 comprise an inner handle portion 25. The main portion 25 is hinged to an outer portion 26 in the handle by a hinge 27 which is preferably stiff in its action. The outer portion 26 is long enough so that when hinged down, its end 28 makes good contact with the table 10. Depending on the height of the teacup 12 and the saucer 11, the handle portion 26 may make this contact straight down, at 90° to the inner portion 25, or it may lie somewhat at an angle. In either event, it has a good enough contact with the table 10, so that it becomes possible to put the tea strainer 15 in the cup 11 in a position such as that shown in FIG. 1 where it will be entirely self-supporting. On the other hand, for other uses, the handle portion 26 can be brought up so that the portions 25 and 26 lie in a straight line.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A tea strainer for use in straining tea into a teacup having a lip, comprising:
    a bowl-like sieve member having a rim and cup-lip engaging means projecting from the rim, and
    a handle secured to said rim and having an inner portion extending out from said rim,
    an outer portion, and
    a stiff hinge connecting the lower surface of the outer portion to the lower surface of the inner portion, for enabling the outer portion to be in line with the inner portion in one position and for it to swing down to engage a table surface, cooperating with said cup-lip engaging means to hold the sieve member stably in the cup.

2. A tea strainer for use in straining tea as it is poured into a teacup having a lip and sitting in a saucer, comprising:
    a bowl-like sieve member having a rim and cup-lip engaging means projecting from the rim, and
    a handle secured to said rim and having
    an inner portion extending therefrom about the distance by which the saucer exceeds the cup lip in radius,
    an outer handle portion greater in length than the height of said cup lip above the bottom of the saucer, and
    a stiff hinge connecting the lower surface of the outer handle portion to the lower surface of the inner handle portion for enabling the outer handle portion to be in line with said inner handle portion in one position and for it to swing down to engage a table surface on which said saucer rests, to cooperate with said cup-lip engaging means to hold the sieve member stably in the cup.

* * * * *